UNITED STATES PATENT OFFICE.

WILLIAM G. S. GRANT, OF HAMILTON, ONTARIO, CANADA, AND LOUIS H. FLANDERS, OF JENKINTOWN, PENNSYLVANIA, ASSIGNORS TO THE ELECTRIC STORAGE BATTERY COMPANY, OF PHILADELPHIA, PENNSYLVANIA, A CORPORATION OF NEW JERSEY.

NEGATIVE-POLE PLATE FOR STORAGE BATTERIES AND PROCESS OF MAKING THE SAME.

1,228,551. Specification of Letters Patent. Patented June 5, 1917.

No Drawing. Application filed October 8, 1913. Serial No. 793,982.

*To all whom it may concern:*

Be it known that we, WILLIAM G. S. GRANT, a subject of the King of Great Britain, residing at Hamilton, Ontario, Canada, and LOUIS H. FLANDERS, a citizen of the United States, residing at Jenkintown, in the county of Montgomery and State of Pennsylvania, have jointly invented certain new and useful Improvements in Negative-Pole Plates for Storage Batteries and Process of Making the Same, of which the following is a specification.

The principal object of the present invention is to provide negative pole plates of the pasted type which shall be dry and charged and in which the active material is free from cracks.

The invention may be practised in two ways. According to one way the plates are pasted in any well known manner but the paste is not allowed to dry from its initial wetting or wetting incident to its manufacture before reduction. In other words, the pasted plates with their paste still wet from the initial wetting incident to its manufacture are reduced before the paste is ever allowed to dry. After the plates have been reduced in such a way that their paste has never been dry from its initial wetting, they are dried in an atmosphere devoid of oxygen or in a non-oxidizing atmosphere. If the paste were allowed to dry from its initial wetting and prior to reduction, as has heretofore been customary, incipient cracking and shrinking would occur during the drying operation, and after reduction and in again drying in an atmosphere devoid of oxygen or in a non-oxidizing atmosphere this cracking and shrinking would be multiplied and accentuated.

According to another way, the pasted plates, while their paste is still wet from the initial wetting incident to its manufacture, are soaked in dilute sulfuric acid of specific gravity approximating 1100 to 1200 more or less for a period of from twelve to forty-eight hours more or less. After this soaking the plates may be allowed to dry or not as desired and are then reduced and dried in an atmosphere devoid of oxygen or a non-oxidizing atmosphere.

In each way the paste while wet from the initial wetting to which it is subjected in its manufacture and without having ever dried, is subjected to the prolonged action of dilute sulfuric acid before it is ever dried. In the first way this occurs in the dilute acid in which the reduction takes place and in the second way this takes place in a specially provided soaking in dilute sulfuric acid. In each case and as a result of never letting the paste dry from its initial wetting that is incident to its manufacture, it is possible to obtain the negative pole plates not only dry and charged but also with their active material free from cracks and shrinkage. The importance of this attainment will be evident to those skilled in the art. It may be said that such plates are capable of being handled and exposed to such variations, shocks and the like as are ordinarily met with for example in shipment.

What we claim as new and desire to secure by Letters Patent is:

1. A dry charged negative pole plate of the pasted type for storage batteries having coherent active material free from cracks and consisting substantially of pure lead and ready for discharge, without further electric charge, when mounted in a battery, substantially as described.

2. The improvement in the art of making dry reduced negative pole plates which consists in reducing them before their paste is ever dried from its initial wetting incident to its manufacture and consequently subjecting them to the prolonged action of dilute sulfuric acid, and drying the plates while their paste is wet from the reducing operation in a non-oxidizing atmosphere.

3. The improvement in the art of making dry reduced negative pole plates which consists in subjecting them to a prolonged soaking in dilute sulfuric acid while their paste is wet from its initial wetting incident to its manufacture, reducing the plates and while the paste is wet from the reducing operation, drying the plates in a non-oxidizing atmosphere, substantially as described.

In testimony whereof we have hereunto signed our names.

WILLIAM G. S. GRANT.
LOUIS H. FLANDERS.

Witnesses as to Grant:
ELLA BECKER,
ANNIE M. HERRIMAN.

Witnesses as to Flanders:
GEO. M. HOWARD,
CARL F. GEBHART